US008692426B2

(12) United States Patent
Gan et al.

(10) Patent No.: US 8,692,426 B2
(45) Date of Patent: Apr. 8, 2014

(54) DIRECT CURRENT MOTOR INCORPORATING THERMAL CONTROL

(75) Inventors: Wai Chuen Gan, Kowloon (HK); Gary Peter Widdowson, Mid Levels (HK)

(73) Assignee: ASM Assembly Automation Ltd, Hong Kong (HK)

( * ) Notice: Subject to any disclaimer, the term of this patent is extended or adjusted under 35 U.S.C. 154(b) by 649 days.

(21) Appl. No.: 12/482,843

(22) Filed: Jun. 11, 2009

(65) Prior Publication Data

US 2010/0314953 A1 Dec. 16, 2010

(51) Int. Cl.
*H02K 11/00* (2006.01)
*H02K 41/035* (2006.01)

(52) U.S. Cl.
USPC ............... 310/68 C; 310/12.19; 310/12.21; 310/12.29; 310/68 R

(58) Field of Classification Search
USPC .................. 310/12.19, 12.21–12.23
See application file for complete search history.

(56) References Cited

U.S. PATENT DOCUMENTS

| 6,735,035 B1 * | 5/2004 | Smith et al. .................. 360/69 |
| 7,808,133 B1 * | 10/2010 | Widdowson et al. ...... 310/12.05 |
| 7,906,930 B2 * | 3/2011 | Takeuchi et al. .............. 318/687 |
| 2003/0127933 A1 * | 7/2003 | Enomoto et al. .............. 310/194 |
| 2007/0030547 A1 * | 2/2007 | Dullin et al. .................. 359/196 |

FOREIGN PATENT DOCUMENTS

JP         09275696 A   * 10/1997   ............... H02P 7/00

OTHER PUBLICATIONS

JP09275696A Machine Translation, Sato, Oct. 1997.*

* cited by examiner

*Primary Examiner* — Burton Mullins
*Assistant Examiner* — Eric Johnson
(74) *Attorney, Agent, or Firm* — Ostrolenk Faber LLP

(57) ABSTRACT

A direct current motor comprises a magnet assembly having a pair of magnets for generating a magnetic field and a coil assembly located between the pair of magnets, the coil assembly and the magnet assembly being movable relative to each other. The coil assembly further comprises a first coil section and a second coil section which are electrically connected to each other. A current generator is electrically connected to the coil assembly and is operative to provide first, second and third currents. The first current is electrically connected directly to the first coil section and the second current is electrically connected directly to the second coil section whereas the third current is electrically connected to the first and second coil sections at a position connecting the first and second coil sections.

18 Claims, 3 Drawing Sheets

DIRECT CURRENT MOTOR INCORPORATING THERMAL CONTROL

FIELD OF THE INVENTION

The invention relates to a direct current ("DC") motor, and in particular, to a DC motor comprising a thermal control system for maintaining a stable motor temperature.

BACKGROUND AND PRIOR ART

A DC motor works by converting electrical energy into mechanical energy. This is accomplished by passing current through a coil located in a magnetic field which results in a force or torque that moves the coil linearly along an axis or spins the coil if the coil is on a rotational axis. The simplest DC motor is a single coil apparatus and is driven by a single phase current.

FIG. 1 is an isometric view of a typical linear DC motor 100 with a conventional magnetic circuit arrangement. The DC motor 100 comprises two permanent movable magnetic tracks 102 and a single phase coil 104 located between the magnetic tracks 102. A power supply supplies current to the coil 104 through electrical connections 106. When a current passes through the coil 104 in the presence of a magnetic field generated by the magnetic tracks 102, a force or a torque will be generated. However, with this simple construction, it is not possible simultaneously to control both the driving force and the heat generated in the DC motor 100.

A DC motor is advantageous as compared to a multi-phase AC motor as the magnetic circuit of a DC motor is simpler and the optimal generation of a force or torque is not dependent on information regarding the motor position. This feature makes DC motors particularly suitable for applications where positional information on the DC motor is difficult to obtain. On the other hand, heat control in a DC motor will typically require an external heater for maintaining thermal stability of the motor, but such an external heater increases component count and the cost of the system.

It is therefore desirable to devise a DC motor with independent torque and thermal control without having additional components and increased costs.

SUMMARY OF THE INVENTION

It is thus an object of the invention to seek to provide a DC motor with built-in thermal control capability for stabilizing a temperature of the DC motor.

According to a first aspect of the invention, there is provided a direct current motor comprising: a magnet assembly having a pair of magnets for generating a magnetic field; a coil assembly located between the pair for magnets, the coil assembly and the magnet assembly being movable relative to each other, the coil assembly further comprising a first coil section and a second coil section electrically connected to each other; a current generator electrically connected to the coil assembly which is operative to provide first, second and third currents, the first current being electrically connected directly to the first coil section, the second current being electrically connected directly to the second coil section and the third current being electrically connected to the first and second coil sections at a position connecting the first and second coil sections.

According to a second aspect of the invention, there is provided a method for controlling a temperature of a direct current motor comprising a magnet assembly having a pair of magnets for generating a magnetic field and a coil assembly located between the pair of magnets, the coil assembly and the magnet assembly being movable relative to each other, the method comprising the steps of: providing a first current directly to a first coil section of the coil assembly; providing a second current directly to a second coil section of the coil assembly, wherein the second coil section is electrically connected to the first coil section; and providing a third current to a position connecting the first and second coil sections; wherein the first, second and third currents are provided by a current generator.

It will be convenient to hereinafter describe the invention in greater detail by reference to the accompanying drawings, which illustrate one embodiment of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of one preferred embodiment of the invention when considered with the accompanying drawings, in which.

DETAILED DESCRIPTION OF THE PREFERRED EMBODIMENT OF THE INVENTION

Figure 1:
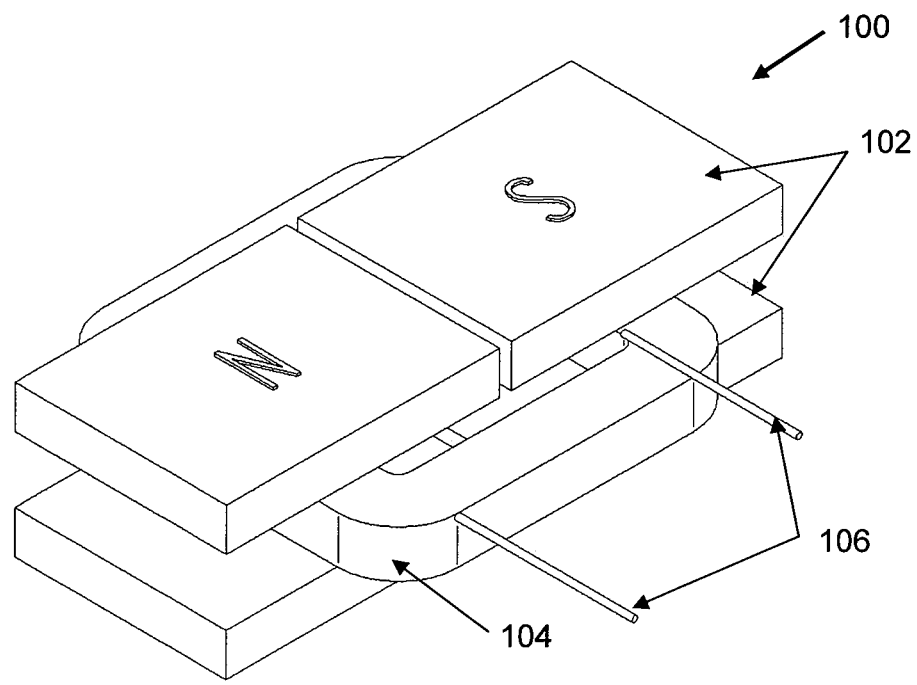
FIG. 1 is an isometric view of a typical linear DC motor with a conventional magnetic circuit arrangement.
Figure 2:
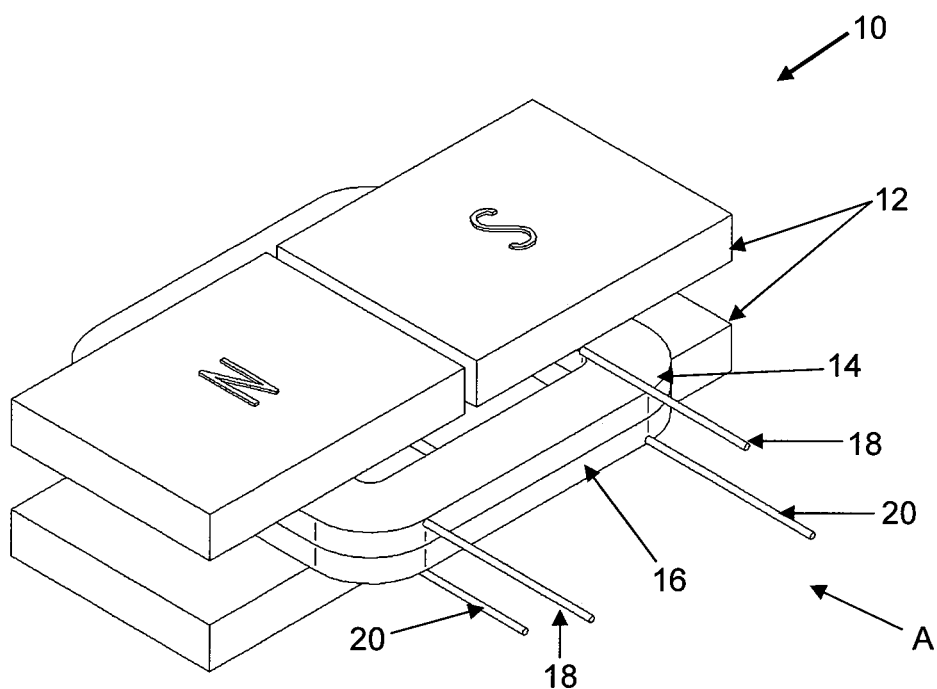
FIG. 2 is an isometric view of a linear DC motor according to the preferred embodiment of the invention incorporating a thermal control system.

FIG. 2 is an isometric view of a DC motor, such as a linear DC motor 10, according to the preferred embodiment of the invention incorporating a thermal control system. The DC motor 10 comprises a magnet assembly having a pair of magnets for generating a magnetic field, which may be in the form of two movable permanent magnet tracks 12 with a conventional magnetic circuitry. The DC motor 10 further comprises a coil assembly including a plurality of coil sections, such as first and second motor coil sections 14, 16. The coil sections 14, 16 are positioned adjacent to each other and are both located between the two permanent magnet tracks 12. The first and second coil sections 14, 16 and the permanent magnet tracks 12 are movable relative to each other.

The first and second coil sections 14, 16 may be configured to be stationary whereas the permanent magnet tracks 12 may be configured to move with respect to the first and second coil sections 14, 16. In another preferred embodiment, the permanent magnet tracks 12 are stationary while the motor coils are movable. A first set of electrical connections 18 supplies power to the first motor coil section 14, whereas a second set of electrical connections 20 supplies power to the second motor coil section 16. The motor coil sections 14, 16 are electrically connected in series. Generally, when three or more coil sections are used, they are also connected in series.

Figure 3:
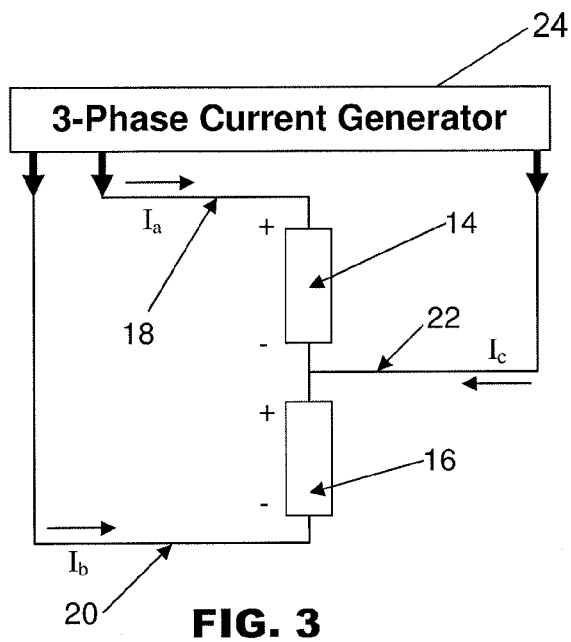
FIG. 3 is an electrical circuit showing a center-tap wire connected to the DC motor of FIG. 2.

FIG. 3 is an electrical circuit showing a center-tap wire 22 connected to the DC motor 10 of FIG. 2. Basically, the electrical circuit is separated into two coil sections comprising the first and second motor coil sections 14, 16 respectively, and the center-tap wire 22 is centrally connected between the two motor coil sections 14, 16. A three-phase current generator 24 supplies current to the first and second coil sections 14, 16 via the first and second sets of electrical connections 18, 20 respectively, as well as the center-tap wire 22.

Figure 4:
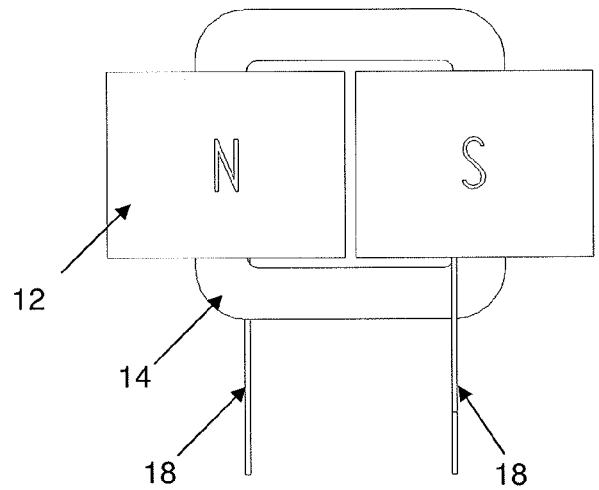
FIG. 4 is a top view of the DC motor of FIG. 2.
Figure 5:
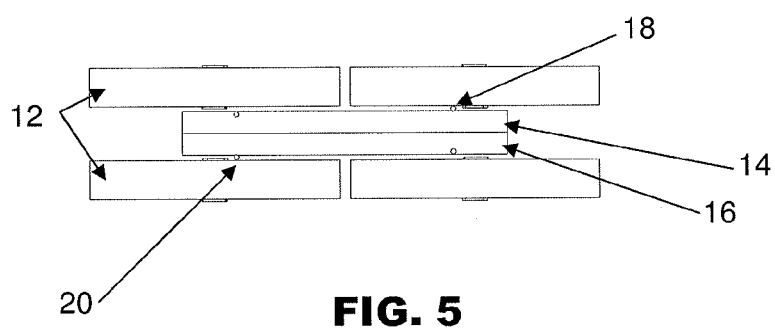
FIG. 5 is a side view of the DC motor from direction A of FIG. 2.

FIG. 4 is a top view of the DC motor 10 of FIG. 2 and FIG. 5 is a side view of the DC motor 10 from direction A of FIG. 2.

When a single phase motor driver is connected to the first and second motor coil sections 14, 16, the setup would be equivalent to a conventional DC motor. However, in the case of the DC motor 10 according to the preferred embodiment of the invention, a current generator in the form of a three-phase motor driver 24 instead of a single phase motor driver is connected to the first and second motor coil sections 14, 16. A first current $I_a$ is provided directly to the first motor coil section 14, a second current $I_b$ is provided directly to the second motor coil section 16, and a third current $I_c$ is provided to the first and second motor coil sections 14, 16 via the center-tap wire 22 centrally connected at a position connecting to the first and second motor coil sections 14, 16. The following current tracking algorithms are used:

$$I_a = I_f + I_h$$

$$I_b = -I_f + I_h$$

$$I_c = -2 * I_h$$

wherein the current "$I_f$" generates a magnetic flux for creating a motor driving force and the current "$I_h$" generates heating energy.

According to the above equations, the first and second currents each comprises a force component ($I_f$) for creating a motor force to drive the DC motor 10 and a separate heating component ($I_h$) for generating heat energy. The current "$I_h$" in the first and second currents $I_a$, $I_b$ within the first and second coil sections 14, 16 generates equal magnetic fluxes in opposite directions in each coil section 14, 16 such that the resultant driving force is zero. Importantly, heat is generated in the DC motor 10 due to the ohmic loss in the process arising from resistance in the DC motor 10 caused by the heating current $I_h$ which is configured not to provide a resultant motor force to the DC motor 10.

Meanwhile, the current "$I_f$" in the first and second currents $I_a$, $I_b$ within the first and second coil sections 14, 16 generates a magnetic flux of the same direction in each coil section which creates a resultant force for driving the permanent magnet tracks 12 relative to the coil sections 14, 16. Therefore, the force and heat generated can be independently but simultaneously controlled by regulating the currents "$I_f$" and "$I_h$". Additionally, the DC motor setup of the preferred embodiment allows the force constant of the DC motor 10 to remain substantially the same as compared to that of a conventional DC motor.

Figure 6:
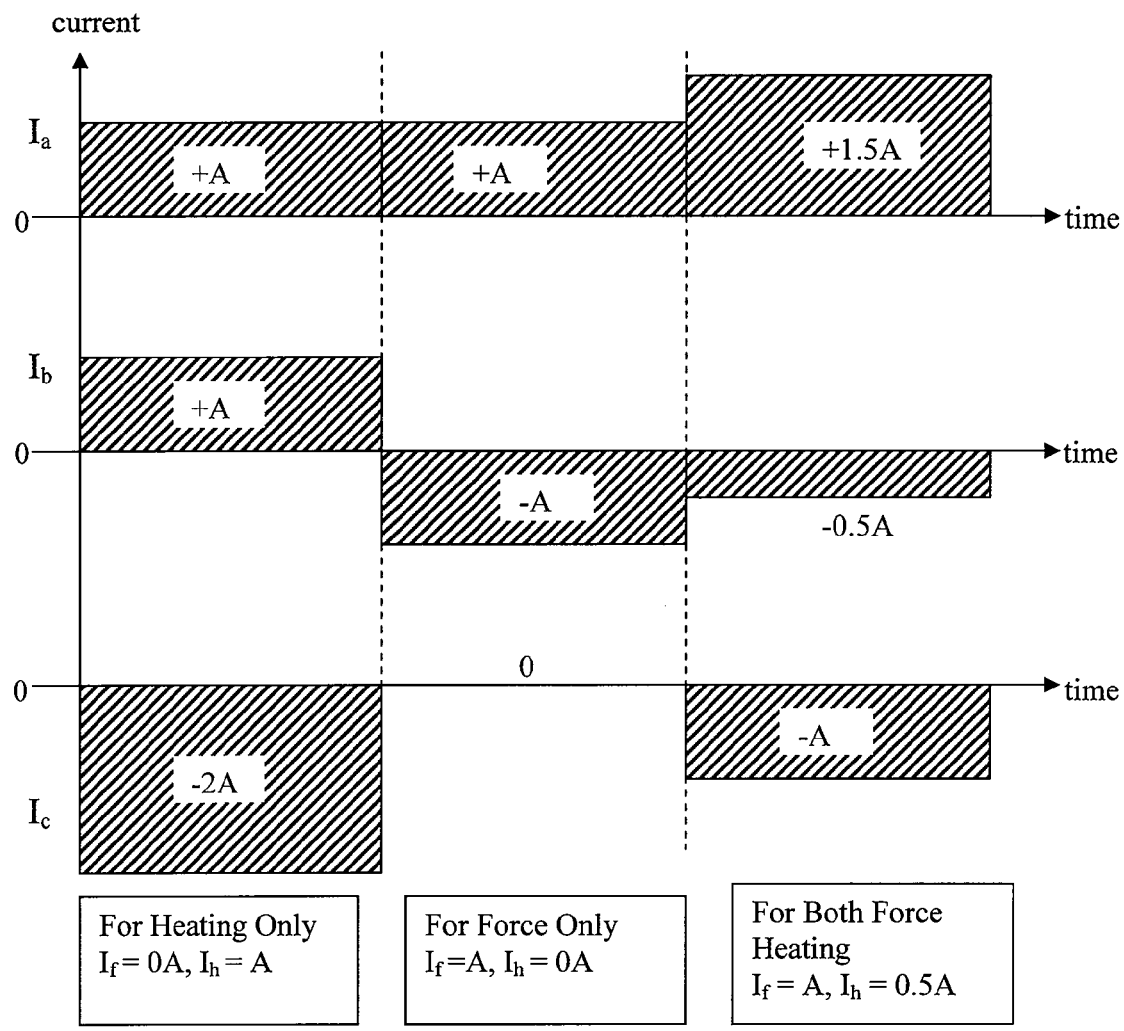
FIG. 6 is a timing chart showing exemplary current excitation profiles for the direct current motor according to the preferred embodiment of the invention.

FIG. 6 is a timing chart showing exemplary current excitation profiles for the direct current motor according to the preferred embodiment of the invention. The respective currents $I_a$, $I_b$ and $I_c$ are controlled such that: $I_a + I_b + I_c = 0$. Thus, applying the formulas set out above:

(a) When only heating of the direct current motor is required: $I_f = 0$ A and $I_h = A$, so that $I_a = +A$; $I_b = +A$; and $I_c = -2$ A.

(b) When no heating is required and only a driving force is to be generated: $I_f = A$ and $I_h = 0$ A, so that $I_a = +A$; $I_b = -A$; and $I_c = 0$ A.

(c) When both heating and driving force generation are required: $I_f = A$ and $I_h = 0.5$ A, so that $I_a = +1.5$ A; $I_b = -0.5$ A; and $I_c = -1$ A.

The DC motor according to the preferred embodiment of the invention may be applied in any DC motor including linear and voice coil motors. One possible application of the DC motor is as a galvanometer motor which generates rotary motion, such as that disclosed in U.S. Pat. No. 6,809,451 entitled "Galvanometer Motor with Composite Rotor Assembly". The coil in the galvanometer motor described in FIG. 2A therein is split into two stator coil portions such that a center-tap terminal may be suitably connected centrally with respect to the two stator coil portions. The above current control algorithm for heat and torque generation may then be applied as described above.

It would be appreciated that the preferred embodiment of the invention provides a significant improvement in motor performance and thermal management of any DC motor system as compared to a DC motor system with an external heater. Since no external heater is required to keep the temperature of the motor in an equilibrium status, this simplifies the mechanical design and results in a system which can be assembled at lower cost. A further advantage is that the conventional magnetic circuit can be used without modification so the system may be kept simple.

The force constant of the motor is also maintained substantially constant in the preferred embodiment of the invention, which improves the efficiency of the DC motor 10. By including the center tap motor coil 22, heat generation control is separated from force or motion generation control so that thermal stability is achieved. In this way, both heat and force can be generated simultaneously. Alternatively, they can also be generated separately if required. Keeping the temperature of the system stable will further help to reduce thermal drift. Thermal drift may result in undesired and uncontrolled expansion of the components of the motor. More accurate motion may therefore be produced by the DC motor 10 according to the preferred embodiment of the invention.

The invention described herein is susceptible to variations, modifications and/or additions other than those specifically described and it is to be understood that the invention includes all such variations, modifications and/or additions which fall within the spirit and scope of the above description.

The invention claimed is:

1. A direct current motor comprising:
    a magnet assembly having a plurality of magnets for generating a magnetic field;
    a coil assembly located between the plurality of magnets, the coil assembly and the magnet assembly being movable relative to each other, the coil assembly further comprising a first coil section and a second coil section electrically connected in series to each other, a center tap wire being connected between the first and second coil sections; and
    a current generator electrically connected to the coil assembly which is operative to provide first, second and third currents, the first current being electrically connected directly to the first coil section, the second current being electrically connected directly to the second coil section and the third current being electrically connected to the first and second coil sections at a position connecting to the first and second coil sections through the center tap wire,
    wherein the third current generates ohmic heat but at the same time does not provide motor force to the direct current motor.

2. The direct current motor as claimed in claim 1, wherein the first and second currents each comprises a force component for creating a motor force to drive the direct current motor and a separate heating component to generate heat energy.

3. The direct current motor as claimed in claim 1, wherein the first and second coil sections are configured such that the first and second currents each generates a magnetic flux of a same direction in the first and second coil sections respectively, whereby to produce a resultant force for driving the magnet assembly and the coil assembly to move relative to each other.

4. The direct current motor as claimed in claim 2, wherein the heating components of the first and second currents are configured to generate equal magnetic fluxes in opposite directions in the respective first and second coil sections such that the resultant force for driving the magnet assembly is zero.

5. The direct current motor as claimed in claim 1, wherein the first and second coil sections are arranged such that flat planar surfaces of the first and second coil sections are parallel to and adjacent to each other.

6. The direct current motor as claimed in claim 1, wherein the current generator comprises a three-phase motor driver.

7. The direct current motor as claimed in claim 1, wherein the coil assembly is configured to be stationary and the magnet assembly is configured to move with respect to the coil assembly.

8. The direct current motor as claimed in claim 1, wherein the direct current motor is a linear motor.

9. The direct current motor as claimed in claim 1, wherein the direct current motor is a galvanometer motor.

10. Method for controlling a temperature of a direct current motor comprising a magnet assembly having a plurality of magnets for generating a magnetic field and a coil assembly located between the plurality of magnets, the coil assembly and the magnet assembly being movable relative to each other, the method comprising the steps of:

providing a first current directly to a first coil section of the coil assembly;

providing a second current directly to a second coil section of the coil assembly, wherein the second coil section is electrically connected in series to the first coil section, a center tap wire being connected between the first and second coil sections; and providing a third current to a position connecting to the first and second coil sections through the center tap wire;

wherein the first, second and third currents are provided by a current generator, and the third current generates ohmic heat but at the same time does not provide motor force to the direct current motor.

11. The method as claimed in claim 10, wherein the first and second currents each comprises a force component for creating a motor force to drive the direct current motor and a separate heating component for generating heat energy.

12. The method as claimed in claim 10, wherein the first and second currents each generates a magnetic flux of a same direction in the first and second coil sections respectively to produce a resultant force for driving the magnet assembly and the coil assembly to move relative to each other.

13. The method as claimed in claim 11, wherein the heating components of the first and second currents generate equal magnetic fluxes in opposite directions in the respective first and second coil sections such that a resultant force for driving the magnet assembly is zero.

14. The method as claimed in claim 10, wherein the first and second coil sections are arranged such that flat planar surfaces of the first and second coil sections are parallel to and adjacent to each other.

15. The method as claimed in claim 10, wherein the current generator comprises a three-phase motor driver.

16. The method as claimed in claim 10, wherein the coil assembly is stationary and the magnet assembly is movable with respect to the coil assembly.

17. The direct current motor as claimed in claim 1, wherein the third current is electrically connected directly to the first and second coil sections, and the third current generates ohmic heat to provide thermal control of the direct current motor, depending on respective ohmic heat generated by the first and second currents.

18. The method as claimed in claim 10, wherein the third current is electrically connected directly to the first and second coil sections, and the third current generates ohmic heat to provide thermal control of the direct current motor, depending on respective ohmic heat generated by the first and second currents.

\* \* \* \* \*